Figure 1:
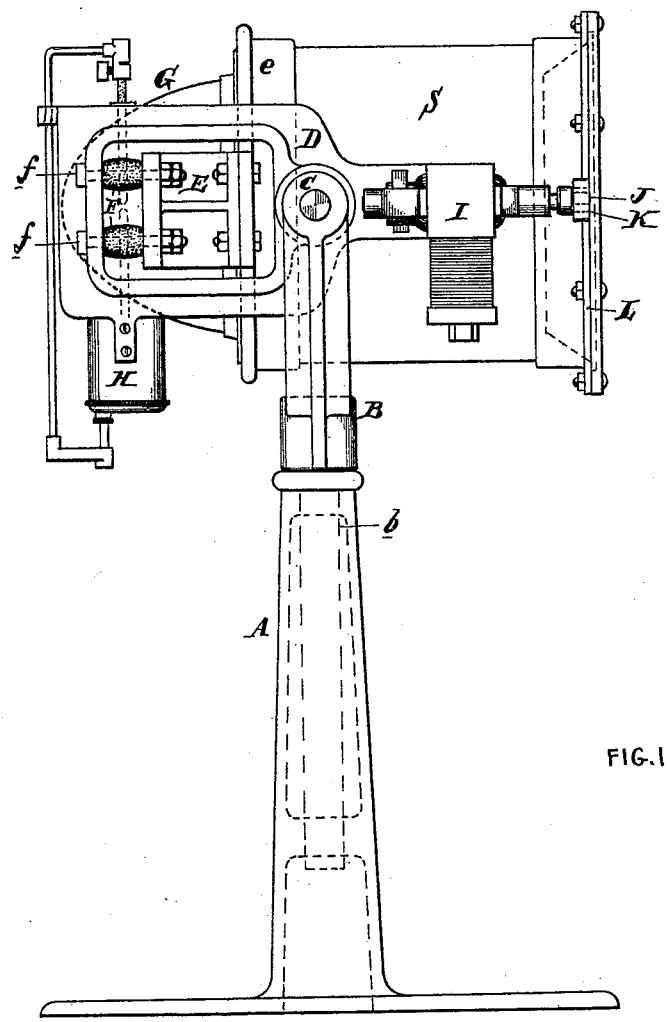

(No Model.) 2 Sheets—Sheet 1.
R. M. HUNTER.
ELECTRIC SEARCH LIGHT.

No. 493,358. Patented Mar. 14, 1893.

Attest
Inventor (No Model.) 2 Sheets—Sheet 2.

R. M. HUNTER.
ELECTRIC SEARCH LIGHT.

No. 493,358. Patented Mar. 14, 1893.

Attest

Inventor

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

ELECTRIC SEARCH-LIGHT.

SPECIFICATION forming part of Letters Patent No. 493,358, dated March 14, 1893.

Application filed September 16, 1891. Serial No. 405,842. (No model.)

*To all whom it may concern:*

Be it known that I, RUDOLPH M. HUNTER, of the city and county of Philadelphia and State of Pennsylvania, have invented an Improvement in Electric Search-Lights, of which the following is a specification.

My invention has reference to long distance electric search lights, and consists of certain improvements which are fully set forth in the following specification and shown in the accompanying drawings which form a part thereof.

This application, Case No. 204, relates to certain improvements upon the invention set out in my application, Serial No. 401,388, filed August 1, 1891, Case No. 203.

In carrying out my invention I support the lamp and reflector and their appendages upon a pedestal so as to have universal movement for the purpose of directing the beam of light in any direction desired. The reflector is supported upon the arm which carries the lamp proper in such a manner that it is flexible in all directions about the arc as a center. This is accomplished by means of spring connections which are arranged at four places about the said arc. By this means the focus is always maintained in the proper position within the reflector, and yet the beam of light may be vibrated so as to cover a large area at the distant point or object to be illuminated. The reflector is so formed as to concentrate the rays of light from the arc, and cause them to be projected from the reflector as parallel rays, so that when they reach the distant object the beam is concentrated and of great illuminating power. The area illuminated however is small, but this defect is obviated by vibrating the beam over the object to be illuminated so that every portion of it receives a flash of the beam of light, and illumination of the object at every point is fixed upon the retina of the eye with each flash of the beam for such a period that the beam returns to the same spot before the impression leaves the retina. By this means the entire object is fully illuminated. By this means an object may be illuminated at a very great distance, even so far that a telescope or field glass would be used by the operator to observe the details of the object illuminated.

I would also say that by my improved construction I have the following advantage over any ordinary light employing the same current, to wit: I am enabled with the employment of a given current to project a beam of light to a greater distance than by the use of those lamps wherein the rays of light diverge to cover large areas. With this intense light, and without vibrating it, I am enabled to discover very distant objects. After the object is discovered I may vibrate the light over it to ascertain its general nature. After ascertaining the nature of the object I may again direct the intense beam of light and hold it upon certain portions of the object so that with a telescope the illuminated portions may be clearly perceived.

Figure 2:
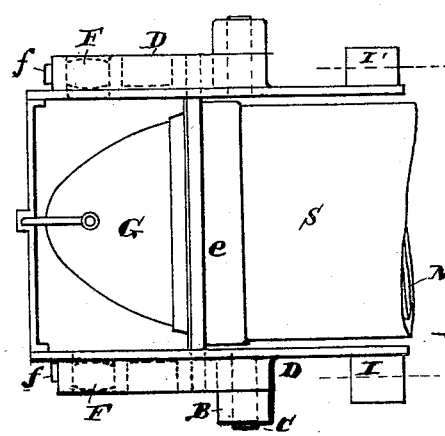
Figure 3:
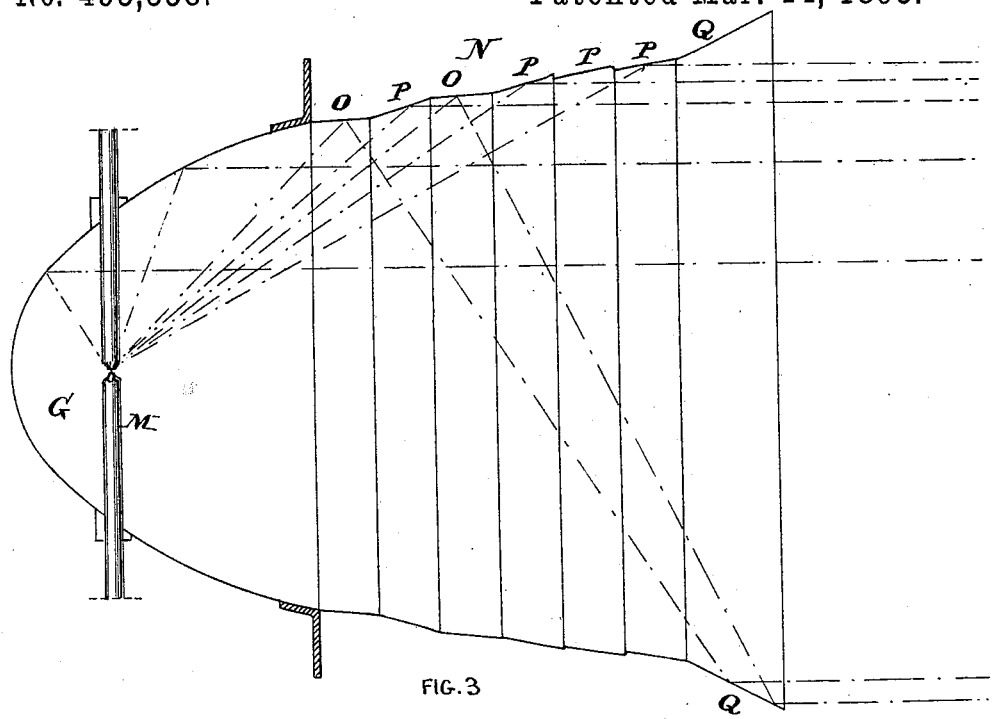
Figure 4:
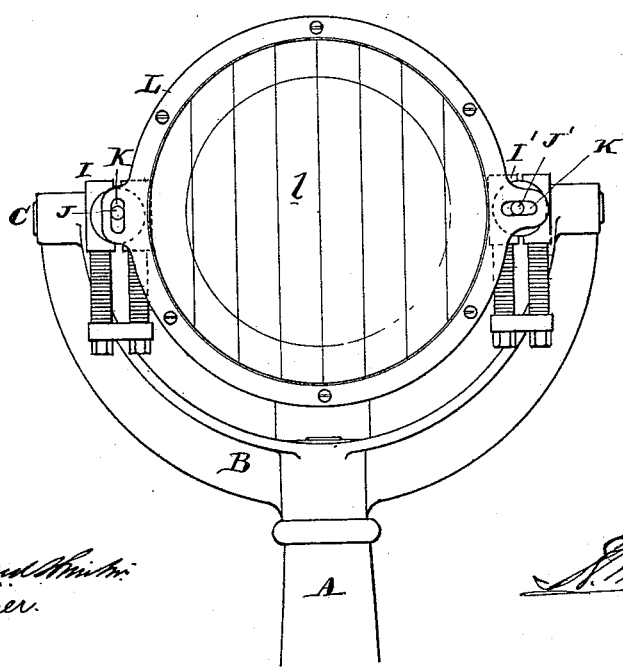

Referring to the drawings:—Figure 1 is a side elevation of a search light embodying my invention. Fig. 2 is a plan view of same with a portion of the front broken away. Fig. 3 is a sectional elevation through the reflector; and Fig. 4 is a front view of the search light with the lower portion of the pedestal removed.

A is the pedestal and is secured upon the back or foundation which acts as the support for the search light.

B is the frame pivoted to the said pedestal A upon a vertical axis $b$ whereby the search light may swing about a vertical axis.

D is a frame which is pivoted to the frame B upon transverse axis C, so that the search light which is secured to this frame D may move in a vertical plane about the transverse axis. By these two possible movements the beam of the search light may be projected in any direction desired. Secured to the frame D is an electric lamp H which is of the focusing character.

G is a reflector of parabolic section and is secured to the frame $e$, which frame by means of brackets E and four rubber or other springs F is secured to the frame D. By this means the reflector G may vibrate vertically and laterally upon the said frame D, and by the disposition of the springs F this vibration would take place about the arc as a center and thereby avoid displacing the focal point of the reflector with respect to the arc of the lamp. An examination of Figs. 1 and 2 will show the disposition of the springs F. The springs upon each side are arranged closer together in the elevation than in the plan, so as to permit the vertical vibration somewhat more easily than the lateral vibration, the object of which will be explained hereinafter.

Secured to the front of the parabolic reflector G through which the carbons M of the electric lamp pass is the reflecting cylinder N which is formed of a series of steps O, P, and Q. These parts O, P, Q are formed like annular bands having different obliquities, so that the bands P reflect the rays of light from the arc in parallel lines from the reflector as indicated, and the annular bands O reflect the rays of light upon the reflector band Q, and this in turn causes the ray to be projected from the lamp in substantially parallel directions.

The object of my improved compound reflector is to cause all of the rays possible to be projected from the arc in a horizontal beam so as to make it as concentrated as possible. If desired lenses may be employed as in my application hereinbefore referred to, and upon which this is an improvement, though the employment of lenses does not form any part of this invention.

The cylindrical reflector N is contained within an annular case S carried by a metal frame e which is bolted to the side brackets E connected with the frame D by means of the bolts f and springs F. The front portion of the case S is provided with an annular flanged casting L which holds the glass l.

Secured upon each side of the search light and carried by the frame D are the two electric motors I I'. One of these motors is provided with a crank J working in a vertical slot K on one side of the frame L, while the crank J' of the other motor I' works in a horizontal slot K' formed in the frame L. When these two motors are running, the effect is to vibrate the search light reflectors both vertically and laterally upon the springs F. The vertical vibrations may be more rapid than the lateral vibrations if so desired, or vice versa, so as to thoroughly cover every portion of the object it is desired to illuminate with the beam of light. The motors and lamp may be operated on circuits substantially as set out in my application hereinbefore referred to, or they may be operated upon independent circuits and be independently controlled.

I do not limit myself to the minor details herein set out as they may be modified in various ways without departing from the principles of my invention.

In this application I do not claim the method herein disclosed broadly as that forms the subject matter of my application Serial No. 401,388, filed August 1, 1891, this application having its method limited to the case in which the beam of light is vibrated about the focal point.

Having now described my invention, what I claim as new, and desire to secure by Letters Patent, is—

1. In a search light, the combination of a frame, an electric lamp carried by said frame, a reflector secured to said frame by means of springs disposed in a transverse plane through the focal point, and mechanical means to vibrate the reflector upon said springs.

2. In a search light, the combination of a frame, an electric lamp carried by said frame, a reflector secured to said frame by means of springs disposed in a transverse plane through the focal point, and mechanical means to vibrate said reflector vertically upon said springs.

3. In a search light, the combination of a frame, an electric lamp carried by said frame, a reflector secured to said frame by means of springs disposed in a transverse plane through the focal point, and mechanical means to vibrate said reflector laterally upon said springs.

4. In a search light, the combination of a frame, an electric lamp carried by said frame, a reflector secured to said frame by means of springs disposed in a transverse plane through the focal point, and mechanical means to simultaneously vibrate said reflector both vertically and laterally upon said springs.

5. In a search light, the combination of a frame, an electric lamp carried by said frame, a reflector secured to said frame by means of springs disposed in a transverse plane through the focal point, mechanical means to vibrate the reflector upon said springs, and a support for said reflector and lamp whereby they may be moved in any direction vertically and laterally.

6. In a search light, the combination of a frame movably supported upon a standard, a source of light, a reflector connected to the said frame by means of springs disposed about the focal point of said reflector, and mechanical devices movable with said movable frame for mechanically vibrating the said reflector.

7. In a search light, the combination of a frame movably supported upon a pedestal or standard, a source of light, a reflector therefor secured to said frame by means of springs disposed about the focal point thereof, two electric motors supported by the said movable frame, and independent power transmitting connections between said motors and the reflector whereby the latter is simultaneously vibrated in two directions at an angle to each other.

8. In a search light, the combination of a frame D supported upon a pedestal or support with freedom of movement about vertical and transverse axes, an electric lamp H supported by said frame D, a reflector G secured to said frame D by means of a series of springs and connecting bolts, electric motors I I' secured to the frame D upon each side of the reflector, and mechanical power transmitting connections between the said electric motors and the reflector whereby the latter is vibrated both vertically and laterally or in directions at angles to each other.

9. In a search light, the combination of a frame D supported upon a pedestal or support with freedom of movement about vertical and transverse axes, an electric lamp H supported by said frame D, a reflector G secured to said frame D by means of springs and connecting bolts, electric motors I I' secured to the frame D upon each side of the reflector, and mechanical power transmitting connections consisting of cranks J and J' and slots K and K' arranged at an angle to each other between the said electric motors and the reflector whereby the latter is vibrated both vertically and laterally or in directions at angles to each other.

10. In a search light, the combination of a source of electric light; a vibrating reflector; two electric motors for vibrating said reflector; and power transmitting connections between the respective motors and the reflector consisting respectively of a crank J and vertical slot K in which it plays, and a crank J' and a horizontal slot K' in which it plays said slots being formed in a frame connecting with the reflector.

11. In a search light, a reflector N consisting of a series of annular reflectors O, P, and Q of which the annular reflectors P project the rays directly from the reflector and the annular parts O project the rays upon the annular part Q and thence from the reflector.

12. In a search light, a reflector N consisting of a series of annular reflectors O, P, and Q of which the annular parts P project the rays directly from the reflector and the annular parts O project the rays upon the annular parts Q and thence from the reflector, in combination with a parabolic reflector G, and an electric lamp having its electrodes M meeting at the focal point of the reflector.

13. The herein described method of lighting which consists in maintaining a light at a focusing point, reflecting the rays of light from the said point by means of reflectors in one direction so as to produce a beam of light, and while maintaining in a fixed position the source of light with respect to the reflector vibrating the said reflector to cause the beam of light to be vibrated about the source of light as a center, whereby the beam of light where it strikes the object to be illuminated may be impressed upon the retina of the eye for all of its positions.

14. The herein described method of lighting which consists in maintaining an intense light at a given focal point, reflecting the rays of light therefrom which radiate either in front or back of said point or source of light in one direction to form a beam of light made up of parallel or substantially parallel rays, and vibrating the said beam of light substantially about the focal point to cause it to rapidly move over the object to be illuminated, whereby the light in all of its positions is impressed upon the retina of the eye.

15. The herein described method of lighting which consists in maintaining an intense light at a given focal point, reflecting the rays of light therefrom which radiate either in front or back of said point or source of light in one direction to form a beam of light made up of parallel or substantially parallel rays, vibrating the said beam of light substantially about the focal point to cause it to rapidly move over the object to be illuminated, whereby the light in all of its positions is impressed upon the retina of the eye, and simultaneously moving the said beam of light independently of its vibrations through space to cover the object desired.

In testimony of which invention I have hereunto set my hand.

R. M. HUNTER.

Witnesses:
ERNEST HOWARD HUNTER,
S. T. YERKES.